(12) United States Patent
Ikejiri et al.

(10) Patent No.: US 10,086,463 B2
(45) Date of Patent: Oct. 2, 2018

(54) ARC WELDING APPARATUS

(71) Applicant: SANSHA ELECTRIC MANUFACTURING CO., LTD., Osaka (JP)

(72) Inventors: Yuji Ikejiri, Osaka (JP); Takeshi Morimoto, Osaka (JP)

(73) Assignee: SANSHA ELECTRIC MANUFACTURING CO., LTD., Osaka (JP)

( * ) Notice: Subject to any disclaimer, the term of this patent is extended or adjusted under 35 U.S.C. 154(b) by 0 days.

(21) Appl. No.: 15/576,411

(22) PCT Filed: Jun. 9, 2016

(86) PCT No.: PCT/JP2016/067159
§ 371 (c)(1),
(2) Date: Nov. 22, 2017

(87) PCT Pub. No.: WO2016/204052
PCT Pub. Date: Dec. 22, 2016

(65) Prior Publication Data
US 2018/0169781 A1    Jun. 21, 2018

(30) Foreign Application Priority Data

Jun. 18, 2015 (JP) ................. 2015-122549
Jun. 23, 2015 (JP) ................. 2015-125538

(51) Int. Cl.
*B23K 9/073* (2006.01)
*H02M 7/5387* (2007.01)
*H02M 3/335* (2006.01)

(52) U.S. Cl.
CPC ......... *B23K 9/073* (2013.01); *H02M 3/33576* (2013.01); *H02M 7/5387* (2013.01); *H02M 7/53871* (2013.01)

(58) Field of Classification Search
CPC .............. B23K 9/073; H02M 3/33576; H02M 7/53871; H02M 7/5387
See application file for complete search history.

(56) References Cited

U.S. PATENT DOCUMENTS 4,371,776 A * 2/1983 Winn ................. B23K 9/073
219/130.32
8,199,530 B2 * 6/2012 Sase ................. H02M 3/33576
363/17

(Continued)

FOREIGN PATENT DOCUMENTS

JP    S61-022264    2/1986
JP    S63-080079    5/1988

(Continued)

OTHER PUBLICATIONS

International Search Report and Written Opinion for corresponding International Application No. PCT/JP2016/067159 dated Aug. 30, 2016.

*Primary Examiner* — Geoffrey S Evans
(74) *Attorney, Agent, or Firm* — Renner Otto Boisselle & Sklar, LLP

(57) ABSTRACT

An arc welding apparatus includes: a switching device connected to both terminals of a secondary winding of a transformer whose opposite primary winding serves as a smoothing reactor on an inverter's secondary side; an output voltage detector detecting an output voltage between a welding wire and a workpiece; and a control circuit controlling the switching device and a circuit on the inverter's primary side. The control circuit includes: a first control portion that turns off the circuit on the inverter's primary side and turns on the switching device when the output voltage detected by the output voltage detector rises to a first predetermined voltage; and a second control portion that turns on the circuit on the inverter's primary side and turns (Continued)

off the switching device after a lapse of a predetermined time after the switching device is turned on.

5 Claims, 7 Drawing Sheets

(56) References Cited

U.S. PATENT DOCUMENTS

| | | |
|---|---|---|
| 2012/0097655 A1 | 4/2012 | Daniel et al. |
| 2012/0120687 A1* | 5/2012 | Ohsaki .................. B23K 9/067 363/21.09 |
| 2013/0223104 A1* | 8/2013 | Tian ...................... H02M 3/335 363/17 |
| 2014/0209586 A1* | 7/2014 | Xu ......................... B23K 9/091 219/130.1 |
| 2016/0346859 A1 | 12/2016 | Daniel et al. |

FOREIGN PATENT DOCUMENTS

| | | |
|---|---|---|
| JP | 01-162573 | 6/1989 |
| JP | 10-146068 | 5/1998 |
| JP | 2006-075890 A | 3/2006 |
| JP | 2014-528360 A | 10/2014 |

\* cited by examiner

Fig.6

Formula 1 $\quad i(t) = -\left(\dfrac{V1-VF}{R}\right) + \left\{\left(\dfrac{V1-VF}{R}\right) + i(0)\right\} \times e^{-\frac{R}{L}T}$ Formula 2 $\quad i(t) = i(0) \times e^{-\frac{R}{L+L1}T}$ Formula 3 $\quad i(t) = i(0) \times e^{-\frac{R}{L}T}$

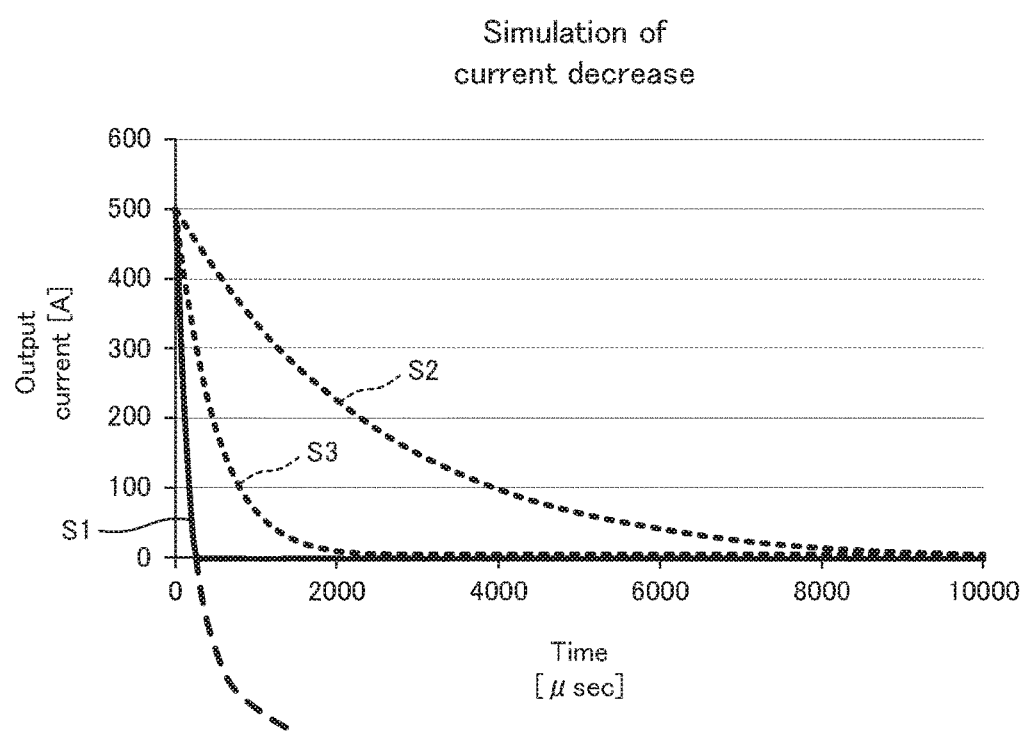

ARC WELDING APPARATUS

BACKGROUND OF THE INVENTION

1. Field of the Invention

The present invention relates to an arc welding apparatus that is provided with an output current control device to reduce the amount of spatter generation.

2. Description of the Related Art

In welding apparatus such as $CO_2$/MAG welding machines where welding is performed on a workpiece using a welding wire as an electrode, spatters are generated during the process of arc welding. Particularly, in a case where an output current has become large, a large number of spatters tend to be generated immediately after a molten droplet at a wire's tip leaves the wire. Thus, it has conventionally been proposed to suppress such occurrences.

For example, as shown in FIG. 1, there is proposed a circuit having a switching module M that consists of a resistor R and a semiconductor switching device SW, both thereof being connected parallel to each other, and is connected in series to an output circuit on an inverter's secondary side (Patent Literature 1). With this circuit, the following control is performed.

It causes the semiconductor switching device SW to be on during a time of shortcircuit when the wire's tip is in contact with the workpiece, and causes the semiconductor switching device SW to be turned off at a timing of arc occurrence when the molten droplet at the wire's tip leaves off the wire as the output current increases. It is when the molten droplet at the wire's tip leaves off the wire that an arc occurs between the wire's tip and the workpiece; and spatters are most likely to be generated at the time when the output current is at its maximum value immediately before the arc occurs. However, with this circuit, because the semiconductor switching device SW is turned off at the above-mentioned timing, it follows that current supply from the inverter's secondary side stops at that moment, thereby making it possible to reduce spatter generation. Further, when the semiconductor switching device SW is turned off, because current arising from an energy having been accumulated in the inductance of the reactor L and the output current cable is supplied through the resistor R to the load (between the wire's tip and the workpiece), the arc is maintained.

When the load current drops more than a certain amount, the semiconductor switching device SW is turned on again; and the above-mentioned operations are repeated. The above operations make it possible to perform the arc welding while suppressing the amount of spatter generation.

CITATION LIST

Patent Literature

[Patent Literature 1]
Japanese Translation of PCT International Application Publication No. JP-T-2014-528360 bulletin

SUMMARY OF THE INVENTION

1. Technical Problem

However, in the above-mentioned prior art, since semiconductor switching device SW to flow the output current from the inverter's secondary side is caused to be on while the output current is increasing (during the time of shortcircuit), an energy loss while the semiconductor switching device SW is on is large enough to deteriorate the power supply efficiency. Moreover, because the welding current is relatively large, enlargement of the semiconductor switching device SW is inevitable; as a result, its cooling device becomes necessary and so on; thus, a problem is that overall structure becomes complicated.

The present invention is directed to providing an arc welding apparatus capable of achieving an increased power supply efficiency and a simplified structure, without employing a semiconductor switching device SW connected in series to an inverter's secondary side.

2. Solution to Problem

An arc welding apparatus according to the present invention comprises:
an inverter provided with a switching circuit;
a rectification circuit that is connected to an output side of the inverter and rectifies an output from the inverter;
a transformer provided with a primary winding and a secondary winding, the primary winding being connected to the output side of the inverter and smoothing a rectification output rectified by the rectification circuit;
an output current supply terminal that performs welding on a workpiece by supplying an output current from the primary winding of the transformer to a welding wire;
a switching device connected between both terminals of the secondary winding of the transformer;
an output voltage detector detecting an output voltage between the welding wire and the workpiece; and
a control circuit controlling the switching device and the switching circuit of the inverter, wherein the control circuit includes:
a first control portion that turns off the switching circuit of the inverter and turns on the switching device when the output voltage detected by the output voltage detector rises to a first predetermined voltage; and
a second control portion that turns on the switching circuit of the inverter and turns off the switching device after a lapse of a predetermined time after the switching device is turned on.

In the present invention, which has a smoothing reactor consisting of the primary winding of the transformer, the switching device connected between both terminals of the secondary winding of the transformer is caused to be off in a state of shortcircuit, and to be turned on when the output current reaches a predetermined value near its maximum, that is, when the output voltage detected by the output voltage detector rises to the first predetermined voltage. The state of shortcircuit is a state in which the wire's tip is in contact with the workpiece and the output current is increasing. When the molten droplet leaves the wire and arcs start to occur out of the state of shortcircuit, a state of arc occurrence begins.

The control circuit causes the switching circuit of the inverter to be turned off and causes the switching device to be turned on when the output voltage detected by the output voltage detector rises to the first predetermined voltage, that is, when the output current reaches the predetermined value near the maximum. This control is performed by the first control portion. At this time, on the output side of the inverter, almost all of energy accumulated in the primary winding of the transformer is induced (commutated) to the secondary winding. The reason for such an occurrence is that through the short-circuiting of the secondary winding the energy having been accumulated in the primary winding of the transformer is induced (commutated) to the secondary winding (short-circuited circuit of the secondary winding serves as a flywheel that accumulates energy). This results in a rapid attenuation of the output current flowing on the output side of the inverter, thereby suppressing spatter generation.

Further, in the present invention, there is provided a voltage source that applies, through the switching device, a predetermined voltage in a direction of reducing the output current between both terminals of the secondary winding. This ensures that spatter generation is suppressed further through following operations.

When the switching device is turned on, almost all of the energy accumulated in the primary winding of the transformer is induced (commutated) to the secondary winding; however, because of an external inductance (inductance of output current line) existent on the secondary side of the inverter, the energy accumulated in the external inductance is consumed completely by the load on the secondary side of the inverter, without being induced (commutated) to the secondary winding. Therefore, it follows that a gradient of an attenuation curve of the output current depends heavily on the existence of the external inductance, and that the larger the external inductance is the less steep the attenuation curve becomes.

However, when the switching device is turned on, the voltage source applies the predetermined voltage to the secondary winding. This voltage, which is induced to the primary winding being transformed to a voltage that depends on turns ratio, is a voltage in the direction of reducing the output current. Then, it follows that a current based on this voltage offsets the current that depends on the external inductance, so that the gradient of the attenuation curve of the output current becomes steeper. That is to say, the output current flowing on the secondary side of the inverter is attenuated rapidly, regardless of the magnitude of the external inductance. As a result, spatter generation is suppressed further. Here, the fact that the current based on the voltage of the voltage source offsets the current that depends on the external inductance means that the energy accumulated in the external inductance is induced (commutated) to the secondary winding.

The control circuit turns on the switching device, and thereafter, after a lapse of a predetermined time, turns on the switching circuit of the inverter, and turns off the switching device. This control is performed by the second control portion. The predetermined time is a short time of usually less than 1 ms, and during this time the output current decreases rapidly. When the switching device is turned off, the energy having been accumulated in the short-circuited circuit of the secondary winding of the transformer as a flywheel circuit is commutated again to the primary winding, and also, an energy is supplied from the switching circuit of the inverter; so that the output current flowing on the output side of the inverter rises rapidly.

Hereinafter, welding is performed under iterations of the control by the first control portion and the control by the second control portion as above-mentioned, and it is the control by the above-mentioned first control portion that suppresses spatter generation.

3. Advantageous Effects of Invention

With the present invention, which does not have a conventional semiconductor switching device that is on in a state of shortcircuit where a wire's tip is in contact with a workpiece, a reduced loss and thus an improved power supply efficiency can be achieved. Also, since an energy having been accumulated in a primary winding of a transformer is induced (commutated) to a secondary winding when a switching device is turned on, an output current on an output side of an inverter is attenuated rapidly; and thus spatter generation can be suppressed sufficiently. Further, at this time, since a predetermined voltage is generated in a direction of reducing the output current in the primary winding of the transformer, it follows that the energy accumulated in the external inductance is induced (commutated) to the secondary winding; and thus the output current on the secondary side of the inverter can be attenuated more rapidly. After that, since the energy having been induced (commutated) to the secondary winding is induced (commutated) to the primary winding again when the switching device is turned off again after a lapse of a predetermined time, rise of the output current becomes faster.

BRIEF DESCRIPTION OF THE DRAWINGS

FIG. 6 is mathematical expressions of output current i(t).

FIG. 7 is simulation results of output current changes.

DESCRIPTION OF THE PREFERRED EMBODIMENTS

Figure 1:
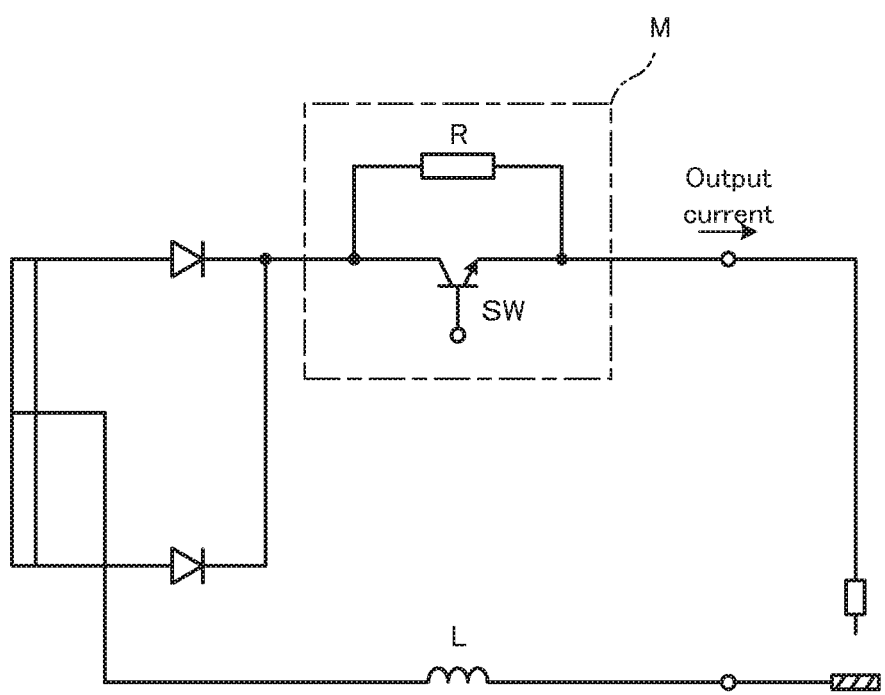
FIG. 1 is a partial circuit diagram of the conventional arc welding apparatus.
Figure 2:
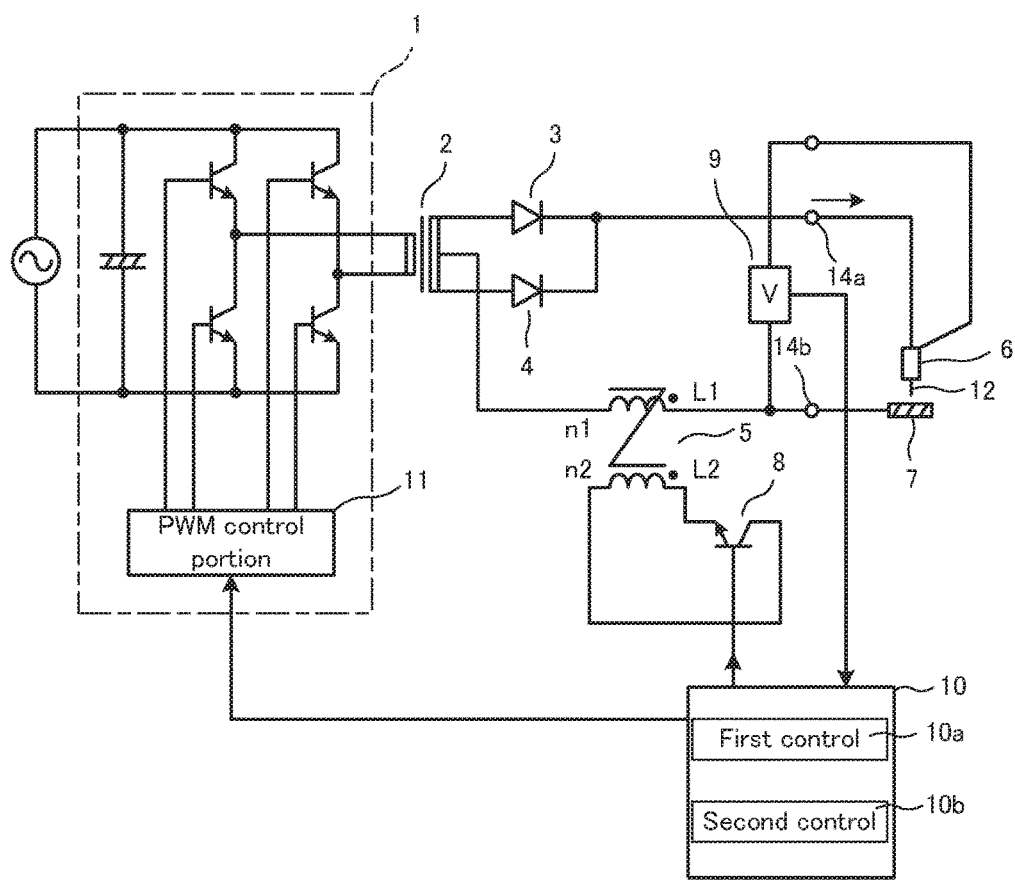
FIG. 2 is a partial circuit diagram of an arc welding apparatus according to an embodiment of the present invention.

FIG. 2 shows a partial circuit diagram of an arc welding apparatus according to an embodiment of the present invention.

A power supply portion of the arc welding apparatus consists of an inverter 1 that takes an AC power supply as input and is provided with a switching circuit performing switching of an AC voltage. An output from the inverter 1 is transformed by a transformer 2, then rectified by rectification diodes 3, 4; and their rectification output is smoothed by a primary winding L1 of a transformer 5, the primary winding L1 serving as a smoothing reactor. An output current that has been rectified and smoothed is output to a torch 6 through output current supply terminals 14a, 14b; and welding is performed between a welding wire 12 that is fed to the torch 6 and a workpiece 7.

The transformer 5 includes the primary winding L1 and a secondary winding L2, whose numbers of turns satisfy a relationship expressed by n1(L1)<n2(L2). Between both terminals of the secondary winding L2, a switching device 8 is connected.

Between a ground line on an output side of the primary winding L1 and the torch 6, a voltmeter 9 is connected.

A voltage detection terminal of the voltmeter 9 is connected to a control portion 10, and control outputs from the control portion 10 are respectively connected to a PWM control portion 11 of the inverter 1 and a gate terminal of the switching device 8. The control portion 10 includes a first control portion 10a and a second control portion 10b.

Figure 3:
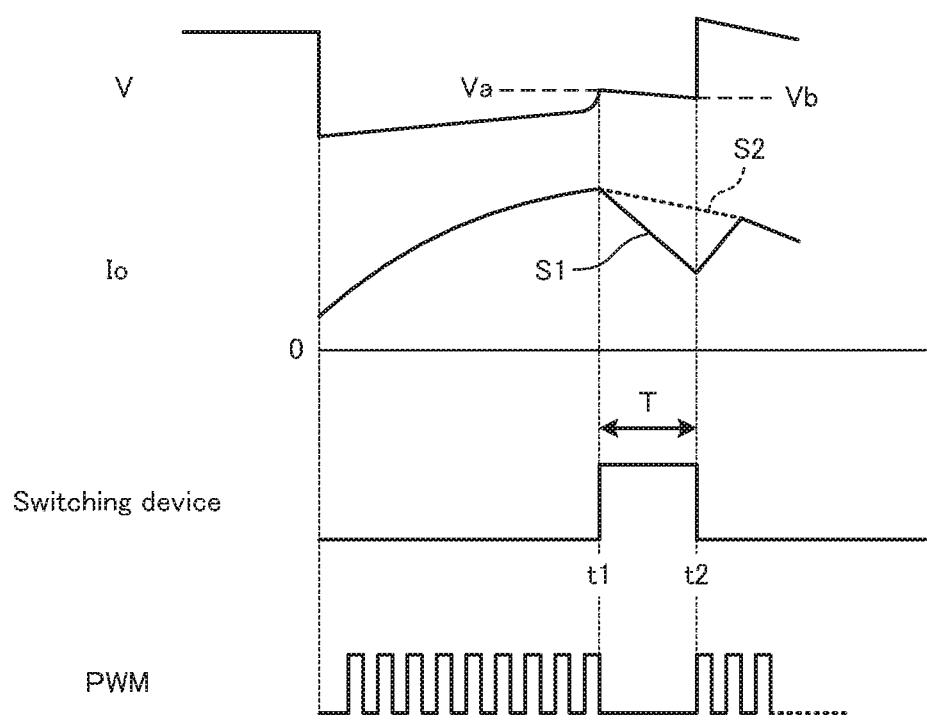
FIG. 3 is a partial waveform chart of the arc welding apparatus according to the embodiment of the present invention.

Subsequently, operations of the arc welding apparatus are explained, referring to FIG. 3.

When the power supply is turned on, the PWM control portion 11 supplies a PMW pulsing signal to the switching circuit consisting of four switching semiconductor devices in the inverter 1, and therewith operation of the inverter 1 starts. The output from the inverter 1 is transformed by the transformer 2, then rectified by the rectification diodes 3, 4, and further smoothed by the primary winding L1 of the transformer 5 to be output to the torch 6. Here, although the primary winding L1 is connected to a midpoint tap of the transformer 2 in FIG. 2, instead, it may be connected to an output side of the rectification diodes 3, 4. The output current rises gradually, and at a timing of t1, the PWM control portion 11 is turned off and the switching device 8 is turned on.

The above-mentioned control is performed by the control portion 10. When a voltage detection value of the voltmeter 9, which is connected to the control portion 10, rises steeply to a value near Va (a first predetermined voltage), the control portion 10, taking this moment as the timing of t1 at which the output current reaches a predetermined value near its maximum, outputs a signal to turn off the PWM control portion 11 to the PWM control portion 11, and also turns on the switching device 8. This control is performed by the first control portion 10a of the control portion 10.

At this time, on the secondary side of the inverter 1, almost all of an energy accumulated in the primary winding L1 of the transformer 5 is induced (commutated) to the secondary winding L2. The reason for such an occurrence is that through the short-circuiting of the secondary winding L2 a short-circuited circuit of the secondary winding serves as a flywheel circuit that accumulates energy and the energy having been accumulated in the primary winding L1 is induced (commutated) to the secondary winding L2. This results in a rapid attenuation of the output current flowing on the secondary side of the inverter 1, thereby suppressing spatter generation. In FIG. 3, the output current change S1 from t1 is an output current change at the time when the above-mentioned control is performed, and the output current change S2 shows an output current change obtained based on the assumption that only the PWM control portion 11 is turned off and the switching device 8 is not turned on at the timing of t1. As to S2, since it has a gentle current decrease as compared with S1, it cannot suppress spatter generation sufficiently; whereas as to S1, since it has a steep current decrease, it can suppress spatter generation sufficiently.

At a timing of t2 after a lapse of a predetermined time T (less than 1 ms), the control portion 10 outputs a signal to turn on the PWM control portion 11 to the PWM control portion 11, and also causes the switching device 8 to be turned off. This control is performed by the second control portion 10b of the control portion 10. At this time, on the secondary side of the inverter 1, an energy having been accumulated in the secondary winding L2 of the transformer 5 is re-induced (commutated) to the original primary winding L1. The reason for such an occurrence is that through the turning-off of the switching device 8 the secondary winding L2 of the transformer 5 is open (the energy having been accumulated in the above-mentioned flywheel circuit is re-induced to the primary winding L1). At this time, because the energy returning from the secondary winding L2 to the primary winding L1 results in an effective consumption as an output current, the output current flowing on the secondary side of the inverter 1 rises rapidly.

Through the above-mentioned operations being iterated, welding is performable while suppressing spatter generation.

In the above embodiment, from the viewpoint of reducing the current flowing in the switching device 8, it is preferred to set the number of turns n2 of the secondary winding L2 of the transformer 5 to be several times greater than the number of turns n1 of the primary winding L1. For example, n1:n2=ca. 1:5 could be a choice. In the case of n1:n2=1:5, a current flowing in the switching device 8 in the predetermined time T during which the switching device 8 is on decreases to one fifth of a current flowing in the primary winding L1 when the switching device 8 is off. In this manner, by making a proper selection of turns ratio, it is possible to configure the switching device 8 with a small current rating.

As another embodiment, it is also possible to set the timing t2 based on a voltage detection value of the voltmeter 9. As can be seen from FIG. 3, the output voltage rises sharply at t1, and then decreases gradually. Then, it is possible to set a time at which this voltage decreases to a second predetermined voltage Vb as the timing t2. However, because the state of arc is unstable, the second predetermined voltage Vb is also unstable. For this reason, it is preferred to set the timing t2 to a time at which the predetermined time T has lapsed from the timing t1.

As stated above, in the above-mentioned arc welding apparatus, a transformer the primary winding of which is a smoothing reactor is connected to a secondary side of an inverter; a switching device is connected between both terminals of the secondary winding of the transformer; the switching device undergoes an on-off control with a predetermined timing; and thus it is made possible to suppress spatter generation, and also to reduce loss of the switching device since it is turned on only when arc occurs.

Figure 4:
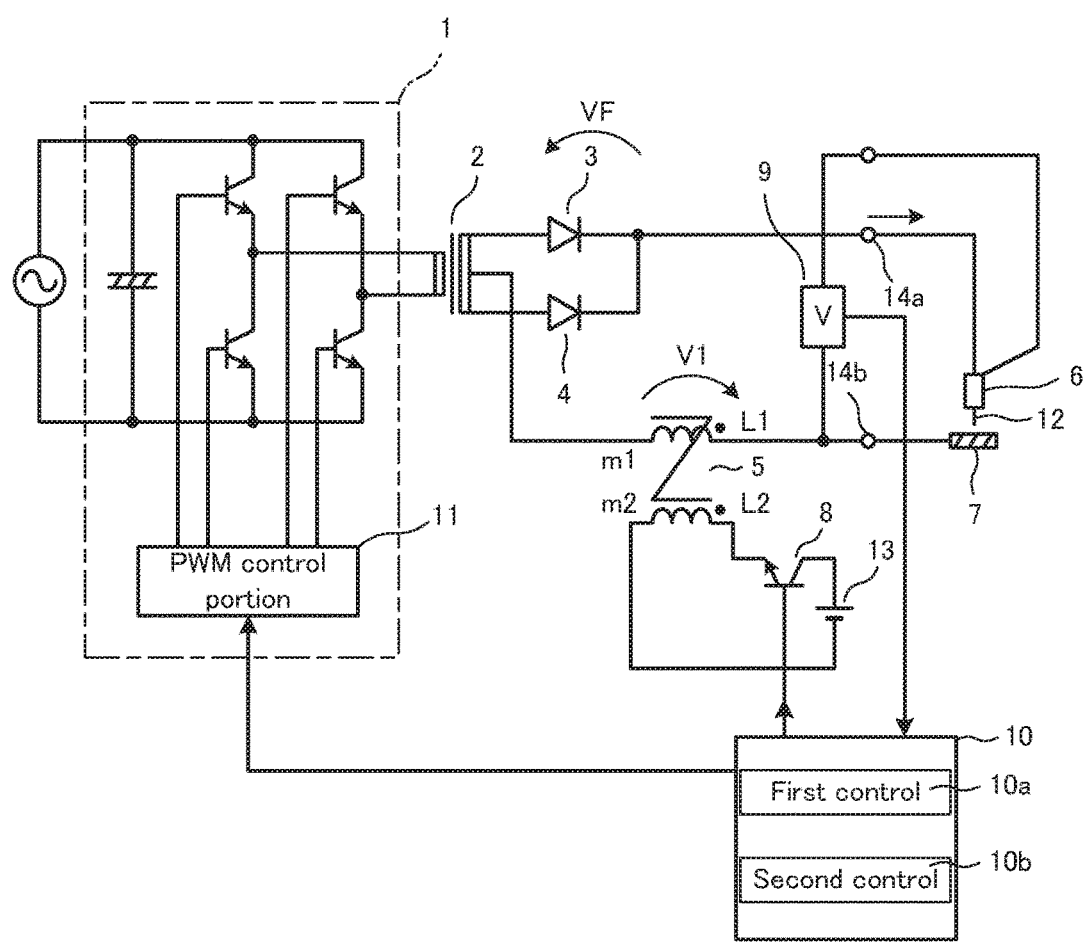
FIG. 4 is a partial circuit diagram of an arc welding apparatus according to another embodiment of the present invention.

FIG. 4 shows a partial circuit diagram of an arc welding apparatus according to another embodiment of the present invention. In the drawing, the same reference signs are given to the same portions as in FIG. 2.

A power supply portion of this arc welding apparatus consists of an inverter 1 that takes an AC power supply as input. An output from the inverter 1 is transformed by a transformer 2, then rectified by rectification diodes 3, 4; and their rectification output is smoothed by a primary winding L1 of a transformer 5 that serves as a smoothing reactor. An output current that has been rectified and smoothed is output to a torch 6 through output current supply terminals 14a, 14b; and welding is performed between a welding wire 12 that is fed to the torch 6 and a workpiece 7.

The transformer 5 includes the primary winding L1 and a secondary winding L2, whose numbers of turns satisfy a relationship expressed by n1(L1)<n2(L2). Between both terminals of the secondary winding L2, a switching device 8 is connected. To the switching device 8, a voltage source 13 generating a DC voltage E is connected. The direction of connection in the polarity of the voltage source E is a direction by which the output current is reduced when the switching device 8 is on.

Between a ground line on an output side of the primary winding L1 and the torch 6, a voltmeter 9 is connected.

A voltage detection terminal of the voltmeter 9 is connected to a control portion 10, and control outputs from the control portion 10 are connected to a PWM control portion 11 of the inverter 1 and a gate terminal of the switching device 8. The control portion 10 includes a first control portion 10a and a second control portion 10b.

Subsequently, operations of the arc welding apparatus are explained, referring to FIG. 5.

When the power supply is turned on, the PWM control portion 11 supplies a PMW pulsing signal to the switching circuit consisting of four switching semiconductor devices in the inverter 1, and therewith operation of the inverter 1 starts. The output from the inverter 1 is transformed by the transformer 2, then rectified by the rectification diodes 3, 4, and further smoothed by the primary winding L1 of the transformer 5 to be output to the torch 6. Here, although the primary winding L1 is connected to a midpoint tap of the transformer 2 in FIG. 4, instead, it may be connected to an output side of the rectification diodes 3, 4. The output current rises gradually, and at a timing of t1, the PWM control portion 11 is turned off and the switching device 8 is turned on.

The above-mentioned control is performed by the control portion 10. When a voltage detection value of the voltmeter 9, which is connected to the control portion 10, rises steeply to a value near Va (a first predetermined voltage), the control portion 10, taking this moment as the timing of t1 at which the output current reaches a predetermined value near its maximum, outputs a signal to turn off the PWM control portion 11 to the PWM control portion 11, and also turns on the switching device 8. This control is performed by the first control portion 10a of the control portion 10.

At this time, on the secondary side of the inverter 1, almost all of an energy having been accumulated in the primary winding L1 of the transformer 5 is induced (commutated) to the secondary winding L2. The reason for such an occurrence is that through the short-circuiting of the secondary winding L2 a short-circuited circuit of the secondary winding serves as a flywheel circuit that accumulates energy and the energy having been accumulated in the primary winding L1 is induced (commutated) to the secondary winding L2. This results in a rapid attenuation of the output current flowing on the secondary side of the inverter 1, thereby suppressing sputter generation.

Further, with the switching device 8 being turned on, the voltage source 13 applies a predetermined DC voltage E to the secondary winding L2. This voltage, which is induced to the primary winding L1 being transformed to a voltage that depends on turns ratio, is a voltage in the direction of reducing the output current. Then, it follows that a current based on this voltage offsets the current that depends on an external inductance, so that the gradient of the attenuation curve of the output current becomes steeper. That is to say, the output current flowing on the secondary side of the inverter 1 is attenuated rapidly, regardless of the magnitude of the external inductance. As a result, sputter generation is suppressed further. Here, the fact that the current based on the voltage of the voltage source offsets the current that depends on the energy having been accumulated in the external inductance equivalently means that the energy accumulated in the external inductance is induced (commutated) to the secondary winding L2.

At a timing of t2 after a lapse of a predetermined time T (less than 1 ms), the control portion 10 outputs a signal to turn on the PWM control portion 11 to the PWM control portion 11, and also causes the switching device 8 to be turned off. At this time, on the secondary side of the inverter 1, an energy having been accumulated in the secondary winding L2 of the transformer 5 is re-induced (commutated) to the original primary winding L1. The reason for such an occurrence is that through the turning-off of the switching device 8 the secondary winding L2 of the transformer 5 is open (the energy having been accumulated in the above-mentioned flywheel circuit is re-induced to the primary winding L1). At this time, because the energy returning from the secondary winding L2 to the primary winding L1 results in an effective consumption as an output current, the output current flowing on the secondary side of the inverter 1 rises rapidly. In FIG. 5, the output current change S1 shows a current attenuation curve that changes being subjected to the above-mentioned operations.

Through the above-mentioned operations being iterated, welding is performable while suppressing sputter generation.

For reference, comparative examples with modified circuit configurations are explained.

Figure 5:
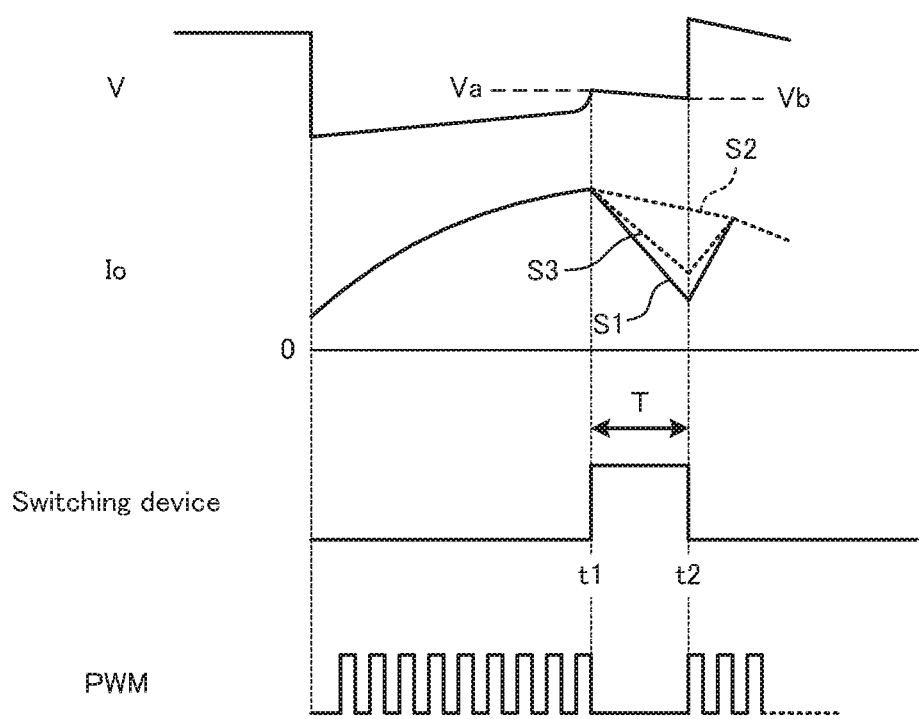
FIG. 5 is a partial waveform chart of the arc welding apparatus according to the other embodiment of the present invention.

In FIG. 5, the output current change S2 (Comparative Example 1) shows an output current change in a case where only the PWM control portion 11 is turned off at the timing of t1, without the switching device 8 nor the voltage source 13 being connected to the secondary winding L2 of the transformer 5. In this Comparative Example 1, the output current is attenuated based on energy accumulated in the inductance L1 of the secondary winding L2 of the transformer 5 and the external inductance L; and thus S2 shows a gentle current decrease as compared with S1; for this reason, sputter generation cannot be suppressed sufficiently.

Also, the output current change S3 (Comparative Example 2) shows an output current change in a case where the PWM control portion 11 is turned off and the switching device 8, which is connected to the secondary winding L2 of the transformer 5, is turned on, while the voltage source 13 is not connected to the secondary winding L2 of the transformer 5. In this Comparative Example 2, an energy in the secondary winding L1 is induced (commutated) to the secondary winding L2; and thus the output current is attenuated based on only the energy accumulated in the external inductance L. For this reason, S3 shows a steep attenuation curve as compared with S2; so that it is possible to suppress sputter generation sufficiently. However, this attenuation curve is gentler than S1 of the present embodiments.

FIG. 6 is mathematical expressions of output current i(t) on the output current change S1 of the present embodiments, and the output current changes S2, S3 of Comparative Examples 1, 2, respectively.

In FIG. 6, signs used in the expressions are as follows.

T: lapse of time from the timing t1 i(0): output current at the timing of t1 i(t): output current after the lapse of time T from the timing t1

L1: inductance of the primary winding L1 of the transformer 5

L: external inductance

R: output impedance

VF: forward voltage drop of the diodes 3, 4 of the rectification circuit n1: number of turns of the primary winding L1 of the transformer 5 n2: number of turns of the secondary winding L2 of the transformer 5

E: DC voltage of the voltage source 13

V1: induced voltage in the primary winding L1 of the transformer 5 by the voltage source E (Formula 1)

This is a formula showing the output current change S1 of the present embodiments where the switching device 8 and the voltage source 13 are connected to the secondary winding L2 of the transformer 5. The PWM control portion 11 is turned off and the switching device 8 is turned on at the timing of t1.

The 2nd term of the right hand side represents a decrease of the output current that arises from the inductance component. The coefficient of the exponential function of the 2nd term is a value given by adding the (V1−VF)/R which is an initial value of the current supplied from the voltage source 13 to the i(0) which is an initial value of the current supplied from the primary side of the transformer 2 at the timing of t1. With the (V1−VF)/R added to the i(0), the attenuation curve of the exponential function becomes steeper. The 1st term of the right hand side represents a current resulting from the output impedance R in DC component. This current has reverse direction against the current by the 2nd term of the right hand side; so that it has minus sign. Therefore, at t=t1 (T=0), i(t)=i(0), and thereafter the attenuation curve of the output current becomes steep.

(Formula 2)

This is a formula showing the output current change S2 of the Comparative Example 1 where neither the switching device 8 nor the voltage source 13 is connected to the secondary winding L2 of the transformer 5. At the timing of t1, the PWM control portion 11 is turned off.

The right hand side represents an attenuation curve of the exponential function, with i(0) denoting the initial value. The inductance component in this case is the inductance (L1) of the primary winding L1 of the transformer 5 and the external inductance L. For this reason, the attenuation curve of the output current is gentle.

(Formula 3)

This is a formula showing the output current change S3 of the Comparative Example 2 where the switching device 8 is connected but the voltage source 13 is not connected to the secondary winding L2 of the transformer 5. The PWM control portion 11 is turned off and the switching device 8 is turned on at the timing of t1.

The right hand side represents an attenuation curve of the exponential function, with i(0) denoting the initial value. The inductance component in this case is only the external inductance L. For this reason, the attenuation curve of the output current becomes steep. However, it is gentler than that of Formula 1.

FIG. 7 shows simulation waveforms of the output current changes S1-S3. As depicted, since S1 is the steepest, it has the highest spatter suppressing effect. Additionally, due to the rectification diodes 3, 4, it never occurs that the current becomes minus.

In the above embodiments, from the viewpoint of reducing the current flowing in the switching device 8, it is preferred to set the number of turns n2 of the secondary winding L2 of the transformer 5 to be several times greater than the number of turns n1 of the primary winding L1. For example, n1:n2=ca. 1:5 could be a choice. In the case of n1:n2=1:5, a current flowing in the switching device 8 in the predetermined time T during which the switching device 8 is on decreases to one fifth of a current flowing in the primary winding L1 when the switching device 8 is off. In this manner, by making a proper selection of turns ratio, it is possible to configure the switching device 8 with a small current rating.

As another embodiment, it is possible to set the timing t2 based on a voltage detection value of the voltmeter 9. As can be seen from FIG. 5, the output voltage rises sharply at t1, and then decreases gradually. Then, it is possible to set a time at which this voltage decreases to a second predetermined voltage Vb as the timing t2. However, because the state of arc is unstable, the second predetermined voltage Vb is also unstable. For this reason, it is preferred to set the timing t2 to a time at which the predetermined time T has lapsed from the timing t1.

As can be seen from the above-mentioned Formula 1, it is possible to modify the attenuation curve of the output current change S1 depending on the magnitude of voltage of the voltage source 13; however, if the attenuation curve becomes steep to such an extent that it is more than necessary by raising the above-mentioned voltage too high, this may cause the arc burn out. On that account, in order to set an optimum voltage for the stabilization of arc and suppression of spatter generation, it is preferred to make sure that this voltage is variable.

As stated above, in the above-mentioned arc welding apparatus, a transformer the primary winding of which is a smoothing reactor is connected to a secondary side of an inverter, and a switching device is connected between both terminals of the secondary winding of the transformer. Further, a voltage source that applies, through the switching device, a predetermined voltage in a direction of reducing the output current is connected between both terminals of the secondary winding. By performing an on-off control of the switching device with a predetermined timing, it is possible to suppress spatter generation; and since the switching device is turned on only at the time when arc occurs, its loss can be reduced.

REFERENCE SIGNS LIST

1—inverter
5—transformer
6—torch
7—workpiece
8—switching device
10—control portion
13—voltage source

The invention claimed is:
1. An arc welding apparatus comprising:
an inverter provided with a switching circuit;
a rectification circuit that is connected to an output side of the inverter and rectifies an output from the inverter;
a transformer provided with a primary winding and a secondary winding, the primary winding being connected to the output side of the inverter and smoothing a rectification output rectified by the rectification circuit;
an output current supply terminal that performs welding on a workpiece by supplying an output current from the primary winding of the transformer to a welding wire;
a switching device connected between both terminals of the secondary winding of the transformer;
an output voltage detector detecting an output voltage between the welding wire and the workpiece; and
a control circuit controlling the switching device and the switching circuit of the inverter, wherein
the control circuit includes:
a first control portion that turns off the switching circuit of the inverter and turns on the switching device when the output voltage detected by the output voltage detector rises to a first predetermined voltage; and
a second control portion that turns on the switching circuit of the inverter and turns off the switching device after a lapse of a predetermined time after the switching device is turned on.

2. The arc welding apparatus according to claim 1, further comprising a voltage source that applies, through the switching device, a predetermined voltage for reducing the output current between both terminals of the secondary winding.

3. The arc welding apparatus according to claim 1, wherein numbers of turns ratio of the secondary winding to the primary winding is n:1 (n is an integer greater than 1).

4. The arc welding apparatus according to claim 1, wherein the control circuit determines a time from one time when the switching device is turned on to another time when the output voltage detected by the output voltage detector decreases to a second predetermined voltage to be the predetermined time.

5. The arc welding apparatus according to claim 2, wherein the voltage source is a variable voltage source.

\* \* \* \* \*